Aug. 14, 1928.
A. C. JUDD
1,680,684
ROD PACKING
Filed July 18, 1922      2 Sheets-Sheet 1
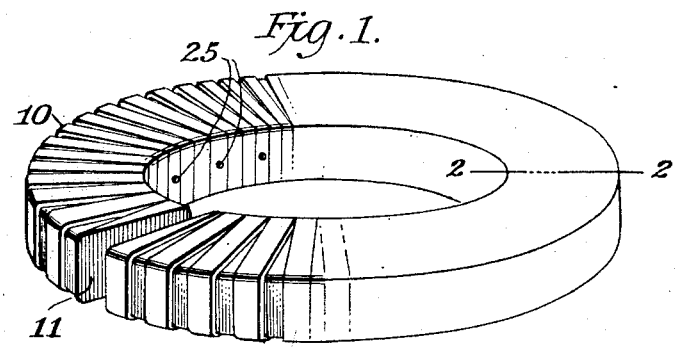
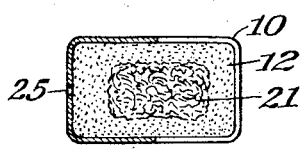
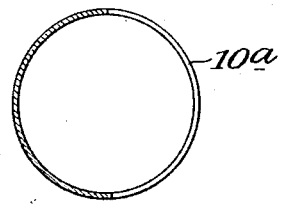
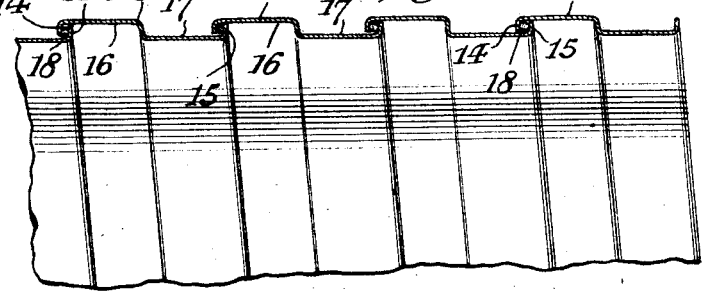
Inventor
A. C. Judd
By his Attorney
Cooper, Kerr & Dunham Aug. 14, 1928. 1,680,684
A. C. JUDD
ROD PACKING
Filed July 18, 1922   2 Sheets-Sheet 2
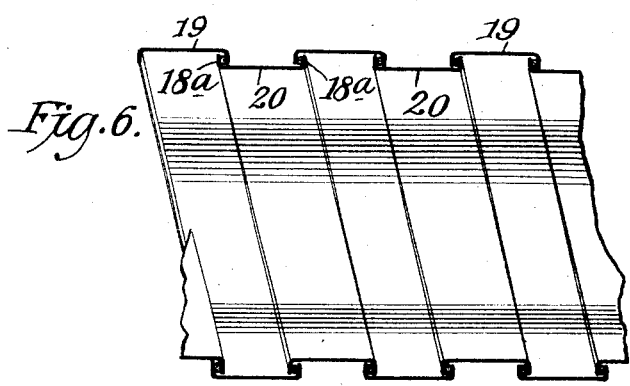
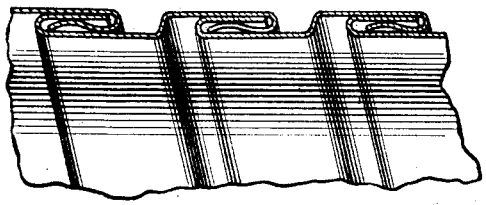
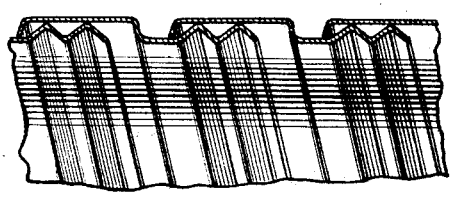
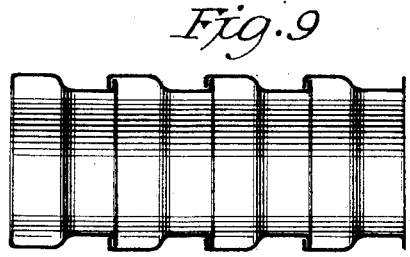
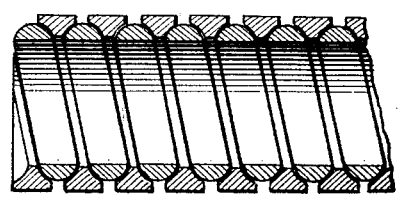
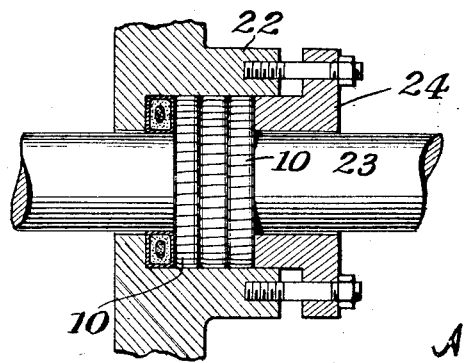
Inventor
A. C. Judd
By his Attorneys,
Cooper, Kerr & Dunham Patented Aug. 14, 1928.

1,680,684

UNITED STATES PATENT OFFICE.

ARTHUR C. JUDD, OF NEW YORK, N. Y.

ROD PACKING.

Application filed July 18, 1922. Serial No. 575,868.

This invention relates to rod-packing, particularly packing composed of hollow or tubular rings of relatively soft metal, preferably containing viscous or plastic lubricant or other suitable material. Heretofore it has been necessary to make such packing rings in definite sizes or curvatures, to correspond to or fit the particular rods with which they are to be used; and need has long been felt for a packing of a more adaptable character, so to speak, which can be used with rods and stuffing boxes of widely different diameters. Accordingly the chief object of my present invention is to provide a hollow-ring lubricant-filled type of packing which is truly flexible and hence can be bent to form rings of a wide range of diameters. Another object is to provide a packing of the class indicated, which can be manufactured and sold in lengths, to be cut up and shaped to the rod by the user, thus making it possible to supply practically all needs with a few standard sizes of packing. A further object is to provide a packing of the class referred to, which shall be thoroughly effective but can withal be manufactured at less cost than can other ring packings. To these and other ends the invention consists in the novel features hereinafter described.

A convenient and effective embodiment of the invention is illustrated in the accompanying drawing, in which Fig. 1 is a perspective view showing one of my improved packing rings, of rectangular cross-section.

Fig. 2 is a cross section on line 2—2 of Fig. 1.

Fig. 3 is a similar section illustrating a ring of circular cross-section.

Fig. 4 is a side or plan view of a short straight piece of one form of my packing, as it appears before being bent to ring shape.

Fig. 5 is an enlarged detail longitudinal section on line 5 of Fig. 4, showing the construction of the particular tubing preferred for the present embodiment.

Fig. 6 is a longitudinal section showing flexible tubing of slightly different construction which can be used for my packing.

Figs. 7, 8, 9 and 10 are longitudinal sectional views of other constructions of flexible tubing that may be used in my packing.

Fig. 11 is a sectional view of a stuffing box and rod packed with my packing.

The packing element illustrated in Figs. 1 and 2 comprises an outer tubular ring 10, split at 11 to permit it to be positioned on the rod (not shown), and filled with lubricant 12. The ring 10 is composed of flexible tubing of the helically-wound overlapped and inter-engaging type. As commonly made, the tubing illustrated is produced by winding helically on a suitable mandrel or form a metal strip, such, for example, as is represented at 13, Fig. 5. As there shown, the strip has in cross section a shape resembling to some extent an elongated letter S. When such a strip is wrapped in the form of a helix on a mandrel or form, the edge-lips or flanges 14, 15, overlap as shown. The intermediate portions 16, 17 permit substantial sliding movement of the edge-flanges 14, 15, and hence the tubing can easily be bent without collapsing and without stretching the metal of its outer wall. Between the edge-flanges a yielding filling, as 18, may be used, composed preferably of a continuous strand of asbestos, wound in place along with the metal strip which forms the tubing.

Another construction of tubing that can be used for my packing is illustrated in Fig. 6. In this form two metal strips 19, 20 are employed, with inwardly and outwardly turned edge-flanges, wrapped together on a mandrel with their flanges mutually engaged, as shown. A yielding strand $18^a$, such as described in connection with Fig. 5, may be used in the tubing shown in Fig. 6, if desired.

The tubing shown in Fig. 7 has the edge-flanges of the strip hooked together, and one of the flanges is formed with a corrugation to give firmer engagement with the co-operating flange on the other side of the strip. In Fig. 8 the construction is similar to that in Fig. 5, but one side flange is formed with two grooves or corrugations. In Fig. 9 the tubing is composed of a succession of rings, roughly conical in form, or having "bell and spigot" ends with circumferential flanges to hold the parts together. Of course it will be understood that one or the other flange of two adjoining rings is formed after the two rings are assembled. In Fig. 10 the tubing is composed of two strips, of the cross-section shown, wrapped together around the form or mandrel. All the types of tubing illustrated are known in the tubing art. They are not, however, the only ones that can be used in my packing. It will be observed that in all cases the edges of the strip or strips (and the end-edges of the rings in Fig. 9) overlap or overhang each other. Preferably, too, these edges are formed with flanges which engage each other and thereby positively hold the turns together, instead of reliance being placed wholly upon the friction of the contiguous overlapped edges, as might be done in some cases.

The flexible tubing is composed of soft metal, so that it will not abrade or otherwise damage the rod with which it is used. Preferably the metal used is a lead alloy, for low pressures, and a soft copper for high pressures. In the former case an alloy composed of lead about 92 per cent, antimony about 4 per cent, and zinc about 4 per cent, gives satisfactory results, having sufficient tensile strength and stiffness to withstand rough handling and yet permit shaping of the packing to the rod and stuffing box without difficulty. For high pressures the copper used is of the soft, annealed type, preferably what is known in the trade as "dead soft". The thickness of the metal is not, in general, important, but of course it should be thick enough to permit rough handling without the tubing being seriously deformed. In most cases a thickness of about .030 to .050 of an inch is satisfactory, but it may be greater for larger tubing and less for smaller tubing.

As will be readily understood, flexible tubing of the type described can be produced in practically any desired length, depending, in general, only upon the length of the metal strip or strips from which it is made.

Preferably the material which the tubing contains, if it contains any at all, is composed essentially of graphite, with enough oil or grease of any suitable kind to make the mixture plastic or stiffly viscous. If desired a thick "rope" of a yielding nature, as for example rubber, or asbestos, oakum, or other fibrous material, can be used in the ring, as indicated at 21, Fig. 2.

The rings are fitted around the rod as indicated in Fig. 11, in which 22 represents a stuffing box and 23 a rod. When the rings are subjected to the pressure of the gland 24 the slight flattening thus produced causes the plastic lubricant to ooze out between the edge-flanges. Ordinarily the lubricant thus supplied to the rod is sufficient in amount, but if not the inner wall of the ring may be provided with small openings, as 25, Figs. 1 and 2, through which additional lubricant can exude.

In practice I prefer to make the tubing circular in cross-section, as indicated at 10ª, Fig. 3, and then by pressure give it a rectangular or other polygonal shape, with more or less rounded corners. The shaping can be done before or after the lubricant is inserted, but in the latter case the tubing should not be entirely filled, since the reduction of the cubic capacity of the tubing, due to the change of form, would, if the tubing were completely filled, expel the excess through the joints or out of one or both ends.

The packing is preferably made in lengths of at least ten feet, to be cut up by the user into pieces short enough to fit around the rod. The ends of the pieces may be left open, or they can be closed, as for example by plates or plugs soldered in place, or by crimping the soft metal inwardly.

It is to be understood that the invention is not limited to the specific structure herein described but can be embodied in other forms without departure from its spirit.

I claim—

1. Rod-packing comprising tubing composed of turns of soft metal adapted to move relatively to each other to permit flexure of the tubing, adjoining turns being provided with means integral with such turns and cooperating with each other to prevent formation of openings between turns when the tube is flexed, and a plastic filler containing lubricating material in said tubing.

2. Rod-packing comprising tubing composed of helically-wound, soft sheet-metal, in strip form, the adjoining edges of which are overlapped and provided with cooperating flanges to prevent separation of the turns but permit free flexure of the tubing, and a suitable filler in the tubing.

3. Rod-packing comprising tubing composed of helically-wound, soft sheet-metal, in strip form, the adjoining edges of which are overlapped and provided with cooperating flanges to prevent separation of the turns but permit free flexure of the tubing, and a suitable filler of plastic lubricant in the tubing.

4. Rod-packing comprising tubing composed of turns of thin soft metal, capable of being bent to ring form on a short radius of curvature without collapse or deformation of its cross sectional shape and without stretching of the metal on the outer face of the ring or thickening of the metal on the inner surface; said tubing containing plastic lubricant, having means permitting the lubricant to escape slowly when the packing is in use, said turns of thin soft metal having at their adjoining edges integral means cooperating with each other to prevent formation of openings between turns when the tubing is bent to ring form.

In testimony whereof I hereto affix my signature.

ARTHUR C. JUDD.